United States Patent
Moser et al.

(10) Patent No.: US 6,612,395 B2
(45) Date of Patent: Sep. 2, 2003

(54) STEERING SYSTEM FOR A VEHICLE

(75) Inventors: Martin Moser, Fellbach (DE); Reinhold Schneckenburger, Rutesheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/849,249

(22) Filed: May 7, 2001

(65) Prior Publication Data

US 2002/0162700 A1 Nov. 7, 2002

(30) Foreign Application Priority Data

May 5, 2000 (DE) ......................................... 100 21 903

(51) Int. Cl.$^7$ ............................................... B62D 5/04
(52) U.S. Cl. ....................... 180/446; 180/443; 180/402; 701/42
(58) Field of Search ................................. 180/402, 443, 180/446; 701/41, 42

(56) References Cited

U.S. PATENT DOCUMENTS

| | | | |
|---|---|---|---|
| 5,247,441 A | * 9/1993 | Serizawa et al. | ............... 701/41 |
| 5,850,888 A | 12/1998 | Bergmann | |
| 6,059,068 A | * 5/2000 | Kato et al. | ............... 180/402 |
| 6,138,788 A | * 10/2000 | Bohner et al. | ............... 180/405 |
| 6,209,677 B1 | * 4/2001 | Bohner et al. | ............... 180/406 |
| 6,244,371 B1 | * 6/2001 | Bohner et al. | ............... 180/403 |
| 6,269,903 B1 | * 8/2001 | Bohner et al. | ............... 180/406 |
| 6,279,675 B1 | * 8/2001 | Bohner et al. | ............... 180/403 |
| 6,285,936 B1 | * 9/2001 | Bohner et al. | ................. 701/41 |
| 6,336,519 B1 | * 1/2002 | Bohner et al. | ............... 180/403 |
| 2002/0092696 A1 | * 7/2002 | Bohner et al. | ............... 180/405 |

FOREIGN PATENT DOCUMENTS

| | | |
|---|---|---|
| EP | 0983926 | 3/2000 |
| WO | 9012723 | 11/1990 |

* cited by examiner

*Primary Examiner*—Lesley D. Morris
*Assistant Examiner*—Daniel Yeagley
(74) *Attorney, Agent, or Firm*—Crowell & Moring LLP

(57) ABSTRACT

A vehicle with a steering handle, which can be actuated by a driver of the vehicle, with at least one steerable vehicle wheel, which is actuated as a function of actuations of the steering handle, with a control system, which allows operation of the steering system on a steer-by-wire level and on a fall-back level and, at least in an emergency, switches from the steer-by-wire level to the fall-back level, with an electric and/or electronic coupling device, which couples the steering handle to the steerable vehicle wheel on the steer-by-wire level, and with a hydraulic and/or mechanical coupling device, which couples the steering handle to the steerable vehicle wheel on the fall-back level.

10 Claims, 1 Drawing Sheet

STEERING SYSTEM FOR A VEHICLE

BACKGROUND AND SUMMARY OF THE INVENTION

This application claims the priority of German patent document 100 21 903.9, filed May 5, 2000.

The invention relates to a steering system for a vehicle, which has at least two operating levels, namely a steer-by-wire level and a fall-back level.

A steering system of this kind is fitted with a steering handle, e.g. steering wheel, which can be actuated by a driver of the vehicle and at which an angle of the steering handle can be set. The vehicle fitted with the steering system furthermore has at least one steerable vehicle wheel. Angles of the vehicle wheel are set as a function of actuations of the steering handle with corresponding provided actuating units. The steering system has a control device that allows the steering system to be operated on the steer-by-wire level and on the fall-back level. Normally, the control device operates the steering system on the steer-by-wire level since this generally allows more convenient operation of the steering of the vehicle. The control system continuously monitors the correct operation of the components of the steering system and switches from the steer-by-wire level to the fall-back level in an emergency.

For its steer-by-wire level, such a steering system has an electric and/or electronic coupling device, e.g. a controlled system, which couples the steering handle to the steerable vehicle wheel in the steer-by-wire mode. For the fall-back level, a hydraulic and/or mechanical coupling device, e.g. a so-called hydraulic rod or a steering column that can be engaged, is provided to couple the steering handle to the steerable vehicle wheel in the emergency mode.

With regard to convenience when driving, the advantages of a steer-by-wire steering system are that almost any transfer functions can be achieved because of the absence or inaction of mechanical or hydraulic positive coupling between the steering handle and the steerable vehicle wheel. In this context, these transfer functions can be described with coupling coefficients that depend on operating parameters of the vehicle or of the steering system. For example, a steering ratio can be formed as a function of the vehicle speed and/or the steering angle. This means that at lower vehicle speeds, for example, the steering ratio is different from that at higher speeds. Similarly, the steering ratio at a smaller steering angle can differ from that at larger steering angles. It is furthermore advantageous to form a servo assistance for reducing the forces and torques to be applied at the steering handle by the driver of the vehicle when setting and holding a steering angle as a function of a least one operating parameter of the vehicle, e.g. vehicle speed and steering angle. In this way, it is possible to implement relatively strong servo assistance for maneuvering and relatively weak servo assistance for driving. It is clear that these functional relationships of the coupling coefficients, when dependant upon the operating parameters, can fundamentally have any appropriate characteristic. The coupling coefficients, namely the steering ratio and servo assistance, and the operating parameters, namely the vehicle speed and the steering angle, should not be understood in the sense of a limitation. On the contrary, any coupling coefficients are conceivable that can be formed as a function of any operating parameters are conceivable.

In contrast to these many and various possibilities for a steer-by-wire steering system, such functional relationships between the steering handle and the steerable vehicle wheel can only be implemented to a very limited extent, if at all, with mechanical and/or hydraulic positive coupling between the steering handle and the steerable vehicle wheel. For emergency operation, however, these convenience restrictions can be accepted. In a steering system of the type stated at the outset, there are thus two fundamentally different functional relationships between the steering handle and the steerable vehicle wheel, namely, on the one hand, for the steer-by-wire level and, on the other hand, for the fall-back level. If the control system then switches from the steer-by-wire level to the fall-back level in an emergency, a jump may occur in the functional relationship of a coupling coefficient, e.g. the steering ratio or the servo assistance, and this can have a disadvantageous effect on vehicle safety.

The present invention is concerned with the problem of specifying an embodiment that ensures improved vehicle safety for a steering system of the type stated at the outset.

The invention is based on the general idea of matching the fundamentally different functional relationships between the steering handle and the steerable vehicle wheel in such a way on the steer-by-wire level, on the one hand, and on the fall-back level, on the other hand, that the coupling coefficients are so close together from a certain limiting value of the operating parameter onwards that a switch between the operating levels of the steering system produces only a small, tolerable, jump or none at all in the dependence between the coupling coefficient and the operating parameter. A difference between the coupling coefficient of the steer-by-wire level and the coupling coefficient of the fall-back level below the stated limiting value for the operating parameter can normally be relatively large, while, according to the invention, this difference is relatively small above the stated limiting value. The magnitude of this difference is defined by a predetermined limiting difference. In this way, it is possible to avoid dangerous driving situations when switching to the fall-back level, thereby increasing vehicle safety.

For example, a steering ratio between the angle of the steering handle and the angle of the vehicle wheel and/or a servo assistance for reducing the forces or torques to be applied at the steering wheel by the driver of the vehicle when setting and holding a steering angle can each form a coupling coefficient which is formed as a function of at least one operating parameter of the vehicle or of the steering system. Functional relationships with the vehicle speed and/or the vehicle acceleration and/or the steering angle are preferred as operating parameters of the vehicle. In this way, it is possible, for example, to represent the steering ratio as a function of the vehicle speed.

The limiting difference prevailing between the coupling coefficients above the limiting value is expediently chosen to be so small that, although a jump in the coupling coefficient when switching between the steer-by-wire level and the fall-back level does cause a disturbance that can be felt by the driver of the vehicle, e.g. at the steering handle, this is within a tolerance range that is permissible for normal driving of the vehicle. Even during normal driving operation, disturbances may occur when, for example, the vehicle runs over an irregularity in the road surface, although this generally leads to a driving situation that can be managed by the driver of the vehicle. In this variant, the extent of the disturbance caused by the jump in the coupling coefficient will therefore generally be such that it can be managed by the driver of the vehicle. However, an embodiment in which the limiting difference is approximately or precisely zero is preferred. The switch from the steer-bywire level to the fall-back level then takes place without a jump in the characteristic of the coupling coefficient and therefore no disturbance can be felt at the steering handle. This further reduces the risk of a critical driving situation.

In a preferred development of the steering system according to the invention, the control system can switch from the steer-by-wire level to the fall-back level at the limiting value of the operating parameter, irrespective of an emergency. This ensures that a deliberate switch to the fall-back level takes place when no dangerous situation can arise on the basis of the prevailing operating states and the existing operating parameters. If an emergency then occurs above the limiting value in the case of a critical operating parameter, the steering system is already being operated on its fall-back level, with the result that no switching process is required, thereby avoiding a critical jump in the characteristic of the respective coupling coefficient. The steering system can, for example, be designed in such a way that the fall-back level is always adopted from a certain vehicle speed onwards.

In another embodiment, there is a plurality of limiting values of increasing magnitude, which are assigned limiting differences of decreasing magnitude. In this way, it is possible, for example, to implement an embodiment in which the coupling coefficients of the steer-by-wire level and of the fall-back level have a relatively large difference at a relatively low speed and have a relatively small difference at a moderate vehicle speed, and are approximately equal at higher vehicle speeds.

In particular, the limiting value of the operating parameter can be used to divide maneuvering operation from driving operation, resulting in particularly convenient steering behaviour of the vehicle.

According to another embodiment, the steering system can be fitted with means for carrying out steering interventions, these means producing steering interventions to stabilize the vehicle independently of the driver of the vehicle but in a manner dependent on driving situations. In a steering system of this kind, these steering interventions take place in such a way, from the limiting value of the operating parameter onwards, that the limiting difference is maintained between the coupling coefficients. This ensures that an emergency and thus the associated switch to the fall-back level does not produce an uncontrollable driving situation even if the switch occurs precisely at a time when a steering intervention is being performed to stabilize the vehicle.

It is self-evident that the features mentioned above and those that will be explained below can be employed not only in the respectively indicated combination but also in different combinations or in isolation without departing from the scope of the present invention.

A preferred exemplary embodiment of the invention is illustrated in the drawings and is explained in greater detail in the following description.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
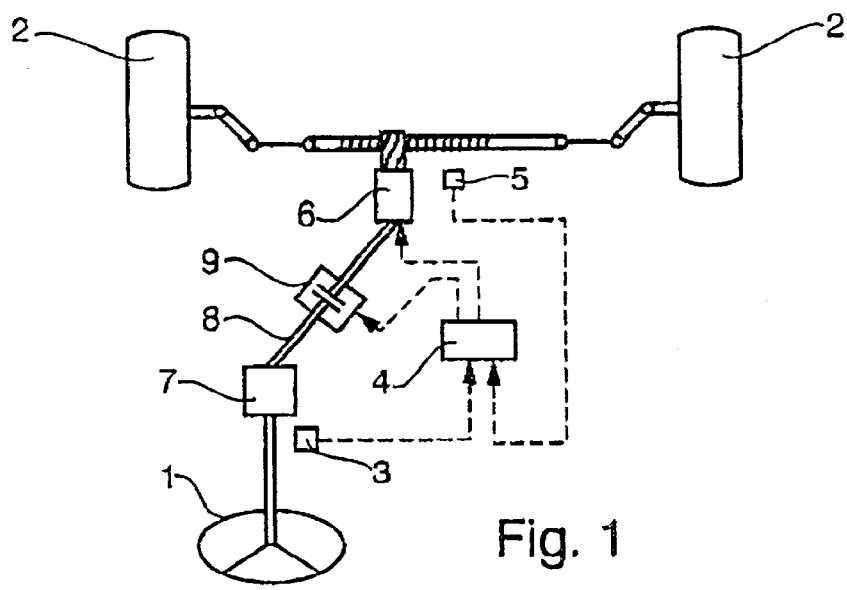
FIG. 1 shows a highly simplified diagrammatic representation of a motor vehicle fitted with the steering system according to the invention.

According to FIG. 1, a vehicle (the rest of which is not shown specifically) has a steering wheel 1, which can be actuated by the driver, and steered vehicle wheels 2 controlled by the wheel. The steering wheel 1 actuates a desired-value transmitter 3, the signals from which represent the steering angles to be set at the steered vehicle wheels 2. These desired-value signals are fed to a desired-value input of a control system 4. An actual-value input of the control system 4 is connected to an actual-value transmitter 5, the signals from which represent the respective actual values of the steering angle of the steered vehicle wheels 2. As a function of a comparison between the desired and the actual values, the control system 4 controls an actuating unit 6, e.g. an electric-motor actuating unit 6, which is connected in terms of drive to the steered vehicle wheels 2 by a conventional steering gear—a pinion, rack and track rods, for example—and performs the steering actuation of the steered vehicle wheels 2. In this way, the actual value of the steering angle of the steered vehicle wheels 2 is thus corrected to the desired value set at the desired-value transmitter 3 by means of the steering wheel 1. The desired-value transmitter 3, the control system 4, the actual-value transmitter 5 and the actuating unit 6 form an electric and/or electronic coupling device that couples the steering wheel 1 to the steered vehicle wheels 2 on a steer-by-wire level.

In the illustrated embodiment, the steering wheel 1 is furthermore connected in terms of drive to an electric motor 7, which serves as a hand-force actuator and accordingly controls a hand force that can be felt at the steering wheel 1, thus enabling a restoring force and an actuating resistance to be felt at the steering wheel 1 as in a conventional vehicle steering system with a continuous mechanical driving link between the steering wheel 1 and the steered vehicle wheels 2.

A mechanical steering column 8, allows positive coupling between the steering wheel 1 and the steered vehicle wheels 2. This steering column 8 contains a clutch 9, which can be actuated by the control system 4 and which is open for the steer-by-wire level and can be closed for a fall-back level. The steering column 8 and the clutch 9 thus form a mechanical coupling device that couples the steering wheel 1 positively to the steered vehicle wheels 2 on the fall-back level in an emergency. It is likewise possible to provide hydraulic positive coupling for the purpose of implementing the fall-back level.

The control system 4 is designed in such a way that, during normal operation of the vehicle, it operates the steering system on its steer-by-wire level while continuously monitoring the steering system to ensure that its components are working properly. As soon as the control system 4 detects an emergency, it switches to the fall-back level, this being effected by closing the clutch 9. On this fall-back level, either the actuating unit 6 or the electric motor 7 can be operated as a servomotor to provide servo assistance, depending on the emergency.

Both on the steer-by-wire level and on the fall-back level, the coupling between the steering wheel 1 and the steered vehicle wheels 2 has at least one coupling coefficient k, which is formed by the steering ratio between the steering wheel 1 and the steered vehicle wheels 2, for example. Here, the steering ratio represents the ratio between a change in the steering angle of the steering wheel 1 and the associated change in the steering angle of the steered vehicle wheels 2. The coupling coefficient can likewise be formed, for example, by the servo assistance used to reduce the forces and/or torques to be applied at the steering wheel 1 by the driver of the vehicle when setting and holding a steering angle.

Figure 2:
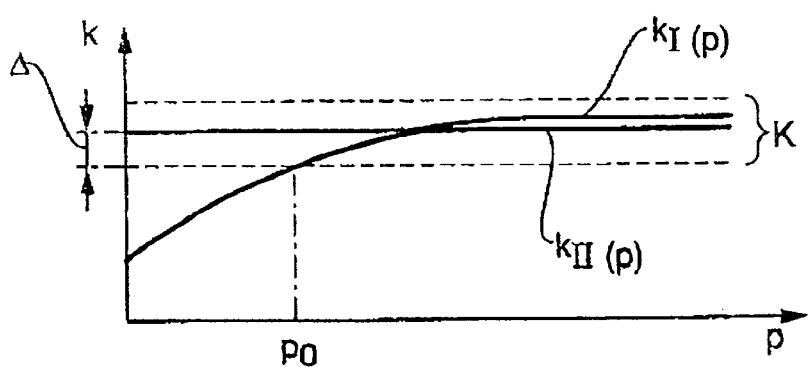
FIG. 2 shows a first diagram illustrating the characteristic of a coupling coefficient as a function of an operating parameter for a steering system according to the invention on a steer-by-wire level and on a fall-back level.
Figure 3:
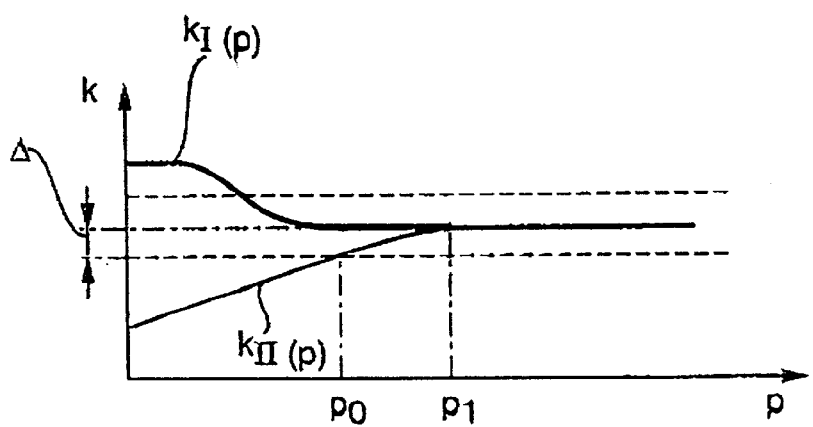
FIG. 3 shows a diagram similar to that in FIG. 1 but for a different embodiment of the invention.

According to FIGS. 2 and 3, this coupling coefficient k can have a functional relationship with respect to an operating parameter p of the vehicle and/or the steering system. An operating parameter p of the vehicle can be formed by the vehicle speed or vehicle acceleration, for example. An operating parameter p of the steering system can be formed by the steering angle or the steering angular velocity, for example.

The diagrams in FIGS. 2 and 3 each show, on the one hand, the characteristic of a first coupling coefficient $k_I$ associated with the steer-by-wire level as a function $k_I(p)$ of the operating parameter p and, on the other hand, the characteristic of a second coupling coefficient $k_{II}$ associated with the fall-back level as a function $k_{II}(p)$ of the operating parameter p. According to FIG. 2, the coupling coefficient k of the fall-back level, i.e. the second coupling coefficient $k_{II}$, has a constant value, for example, while the coupling coefficient k of the steer-by-wire level, i.e. the first coupling coefficient $k_I$, has a value that increases as the operating parameter p increases. The characteristics $k_I(p)$ and $k_{II}(p)$ thus differ in relation to the operating parameter p and there can thus be a difference between the coupling coefficients $k_I$ and $k_{II}$. At a certain limiting value $p_0$ of the operating parameter p, the two coefficients $k_I$ and $k_{II}$ have a limiting difference Δ. In the case of operating parameters p smaller than the limiting value $p_0$, i.e. below the limiting value $p_0$, the difference between the coupling coefficients $k_I$ and $k_{II}$ is greater than the limiting difference Δ. According to the invention, the difference between the coupling coefficients $k_I$ and $k_{II}$ is less than the limiting difference Δ for values of the operating parameter greater than the limiting value $p_0$.

In the embodiment shown in FIG. 2, the difference between the coefficients $k_I$ and $k_{II}$ is always within a band K indicated by a brace, which extends above and below the characteristic $k_{II}(p)$ of the second coefficient $k_{II}$ of the fall-back level at a distance corresponding to the limiting difference Δ.

In contrast, the two characteristics of the coupling coefficients $k_I(p)$ and $k_{II}(p)$ in the variant shown in FIG. 3 continue to approach one another even after the limiting value $p_0$ of the operating parameter has been exceeded. From a second limiting value $p_1$ of the operating parameter $p_1$ onwards, the two coefficients $k_I$ and $k_{II}$ have the same characteristic.

The limiting difference Δ is chosen in such a way that a switch between the steer-by-wire level and the fall-back level always leads to a driving situation that can generally be controlled. The limiting difference D can also assume the value zero, for example, with the result that there is no difference between the coupling coefficients $k_I$ and $k_{II}$. In FIG. 3, this is the case from the second limiting value $p_1$ onwards, for example.

However, if the limiting difference differs from the value zero, it is made at least small enough to ensure that, although a jump in the coupling coefficient k when switching between the steer-by-wire level and the fall-back level does cause a disturbance that can be felt at the steering wheel 1 by the driver of the vehicle, this disturbance is within a tolerance range that is permissible for normal driving of the vehicle. This ensures that a switch between the steer-by-wire level and the fall-back level does not cause a critical driving situation.

The limiting value $p_0$ of the operating parameter p can be used, for example, to divide normal driving operation from slow driving operation, e.g. up to 50 km/h or up to 30 km/h or up to 15 km/h, or from maneuvering.

It is clear that, in the case of a plurality of different coupling coefficients k, each dependent on the same operating parameter p, different limiting values $p_0$ and different limiting differences Δ can be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system for a vehicle, said system comprising:
    a steering handle actuated by a driver of a vehicle, wherein the steering handle can be set at an angle;
    at least one steerable vehicle wheel, wherein said at least one vehicle wheel is set at angles which are a function of actuations of the steering handle;
    a control system for operating said steering system on a steer-by-wire level and on a fall-back level wherein said control system controllably switches from the steer-by-wire level to the fall-back level at least during an emergency;
    an electrical coupling device for coupling the steering handle to the steerable vehicle wheel on the steer-by-wire level;
    at least one of a hydraulic and mechanical coupling device for coupling the steering handle to the steerable vehicle wheel on the fall-back level wherein the coupling between the steering handle and the steerable vehicle wheel is preformed as a function of at least one first coupling coefficient ($k_1$) on the steer-by-wire level and as a function of at least one second coupling coefficient ($k_{11}$) on the fall-back level with each of said first and second coupling coefficients being formed as functions of at least one operating parameter (p) of the vehicle or the steering system with the functions of said at least one operating parameter being formed in such a way that a difference between said first and second coupling coefficients is smaller than a limiting difference (A) for all values of the operating parameter (p) greater than a limiting value (pa).

2. The steering system according to claim 1, wherein a steering ratio between the angle of the steering handle and the angle of the vehicle wheel and/or a servo assistance to reduce the forces and/or torques that have to be applied at the steering handle by the driver of the vehicle when setting and holding a steering angle each form a coupling coefficient (k).

3. The steering system according to claim 1, wherein vehicle speed and/or vehicle acceleration and/or steering angle each form an operating parameter (p).

4. The steering system according to claim 1,
wherein the limiting difference (A) is chosen to be of such a small value that a change in the coupling coefficients when switching between the steer-by-wire level and the fall-back level does not cause a disturbance that can be felt by the driver of the vehicle.

5. The steering system according to claim 1,
wherein the limiting difference (A) is chosen to be so small that a change in the coupling coefficients when switching between the steer-by-wire level and the fall-back level causes a disturbance that can be felt by the driver of the vehicle and is within a tolerance range that is permissible for normal driving of the vehicle.

6. The steering system according to claim 1,
wherein the limiting difference $\Delta$ is substantially zero.

7. The steering system according to claim 1,
wherein the control system switches from the steer-by-wire level to the fall-back level at the limiting value ($p_0$) of the operating parameter (p), irrespective of an emergency.

8. The steering system according to claim 1,
including a plurality of limiting values ($p_0$, $p_1$) of increasing magnitude, which are assigned limiting differences ($\Delta$) of decreasing magnitude.

9. The steering system according to claim 1,
wherein in that the limiting value ($p_0$) of the operating parameter (p) divides maneuvering operation from driving operation of the vehicle.

10. The steering system according to claim 1,
further including means for carrying out steering interventions that take place independently of the driver of the vehicle and in a manner dependent on driving situations and for stabilizing the vehicle, the steering interventions taking place in such a way, from the limiting value ($p_0$) of the operating parameter (p) onwards, that the limiting difference (A) is maintained between the at least one first and the at least one second coupling coefficients ($k_I$, $k_{II}$).

* * * * *